(12) United States Patent
Pandita et al.

(10) Patent No.: US 12,493,748 B2
(45) Date of Patent: Dec. 9, 2025

(54) LARGE LANGUAGE MODEL UTTERANCE AUGMENTATION

(71) Applicant: Microsoft Technology Licensing, LLC, Redmond, WA (US)

(72) Inventors: Rahul Pandita, Arvada, CO (US); Abhishek Masand, Ithaca, NY (US); Priyankar Kumar, New Delhi (IN); Aneesh Bose, West Bengal (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 359 days.

(21) Appl. No.: 18/096,309

(22) Filed: Jan. 12, 2023

(65) Prior Publication Data
US 2024/0143932 A1 May 2, 2024

Related U.S. Application Data

(60) Provisional application No. 63/420,839, filed on Oct. 31, 2022.

(51) Int. Cl.
*G06F 40/30* (2020.01)
*G06F 40/247* (2020.01)
*G06F 40/289* (2020.01)

(52) U.S. Cl.
CPC .......... *G06F 40/30* (2020.01); *G06F 40/247* (2020.01); *G06F 40/289* (2020.01)

(58) Field of Classification Search
CPC ........ G06F 40/30; G06F 40/289; G06F 40/35; G06F 40/44; G06F 40/56; G06F 40/216; G06F 40/237–247
See application file for complete search history.

(56) References Cited

U.S. PATENT DOCUMENTS

| | | | |
|---|---|---|---|
| 8,374,871 B2 * | 2/2013 | Ehsani | G10L 15/22 704/275 |
| 10,811,013 B1 * | 10/2020 | Secker-Walker | G10L 15/1822 |
| 2016/0364382 A1 * | 12/2016 | Sarikaya | G06F 40/40 |
| 2019/0188263 A1 * | 6/2019 | Ock | G06F 40/247 |

(Continued)

OTHER PUBLICATIONS

Anonymous: "Bringing Serenade to the Terminal", Github, Apr. 6, 2017, 2 pages.

(Continued)

*Primary Examiner* — Douglas Godbold
*Assistant Examiner* — Cameron Kenneth Young
(74) *Attorney, Agent, or Firm* — Workman Nydegger

(57) ABSTRACT

Techniques for causing an LLM to generate semantically related phrase variations for an identified phrase are disclosed. An LLM that is generally pre-trained on an arbitrary corpus of language training data is accessed. Seed data is fed as input to the LLM. The seed data includes multiple phrases that are semantically related and that describe a command. When any one of the phrases is received as utterance input, the utterance input triggers execution of the command. The LLM generates multiple phrase variations based on the phrases, where each phrase variation is semantically related to the other phrases. When any one of the phrase variations is received as new utterance input, the new utterance input also triggers execution of the command. The phrases and phrase variations are then stored together in a data storage.

20 Claims, 13 Drawing Sheets

(56) References Cited

U.S. PATENT DOCUMENTS

| | | | | |
|---|---|---|---|---|
| 2019/0237061 | A1* | 8/2019 | Rusak | G06F 40/216 |
| 2019/0355363 | A1* | 11/2019 | Nelson | G10L 15/26 |
| 2020/0184959 | A1* | 6/2020 | Yasa | G10L 15/1815 |
| 2020/0227030 | A1* | 7/2020 | Tan | G06F 40/205 |
| 2020/0356732 | A1* | 11/2020 | Salmon | G06F 40/30 |
| 2021/0073254 | A1* | 3/2021 | Ghafourifar | G06F 40/205 |
| 2021/0224486 | A1* | 7/2021 | Stabler | G06F 18/2148 |
| 2022/0059095 | A1* | 2/2022 | Faria | G10L 15/183 |
| 2022/0164532 | A1* | 5/2022 | Tran | G06F 40/194 |
| 2022/0171938 | A1* | 6/2022 | Jalaluddin | G06F 40/289 |
| 2023/0074406 | A1* | 3/2023 | Baeuml | G06F 16/90332 |
| 2023/0315856 | A1* | 10/2023 | Lee | G06N 3/08 |
| 2024/0143289 | A1 | 5/2024 | Pandita | |
| 2024/0144922 | A1 | 5/2024 | Pandita | |

OTHER PUBLICATIONS

Chen, et al., "Evaluating large language models trained on code", arXiv: Cornell University, Jul. 14, 2021, 35 Pages.

International Search Report and Written Opinion received for PCT Application No. PCT/US2023/033422, Jan. 16, 2024, 11 pages.

International Search Report and Written Opinion received for PCT Application No. PCT/US2023/033423, Jan. 16, 2024, 10 pages.

International Search Report and Written Opinion received for PCT Application No. PCT/US2023/033424, Jan. 17, 2024, 12 pages.

Pedro, Augusto, "Speech to Code—Enables you to code using just your voice," Github, Mar. 12, 2022, 5 pages.

Pedro, Augusto., "Spoken," speech-to-code, Github, Jul. 1, 2022, 3 pages.

Pedro, Augusto., "Write text", speech-to-code, Github, Jul. 1, 2022, 2 pages.

Sahu, et al., "Data Augmentation for Intent Classification with Off-the-shelf Large Language Models," arxiv.org, Cornell University Library, 201 Olin Library Cornell University Ithaca, NY 14853, Apr. 5, 2022, 11 Pages.

Team Snorkel, "Prompting methods with language models and their applications to weak supervision", Snorkel AI, Jan. 19, 2022, Retrieved from URL: https://web.archive.org/web/20221003014435/https://snorkel.ai/prompting-methodswith-language-models-nlp/, 20 Pages.

Wu, et al., "Incorporating Instructional Prompts into a Unified Generative Framework for Joint Multiple Intent Detection and Slot Filling", In Proceedings of the 29th International Conference on Computational Linguistics, Oct. 2022, pp. 7203-7208.

Notice of Allowance mailed on Jun. 20, 2024, in U.S. Appl. No. 18/096,466, 9 pages.

Notice of Allowance mailed on Feb. 27, 2025, in U.S. Appl. No. 18/093,498, 16 pages.

"Inside-Outside-Beginning (tagging)", Retrieved From: https://en.wikipedia.org/wiki/Inside%E2%80%93outside%E2%80%93beginning_(tagging), Dec. 13, 2022, 3 Pages.

Liu, et al., "Pre-train, prompt, and predict: A systematic survey of prompting methods in natural language processing", In Repository of arXiv:2107.13586v1, Jul. 28, 2021, pp. 1-46.

International Preliminary Report on Patentability received for PCT Application No. PCT/US2023/033422, May 15, 2025, 6 pages.

International Preliminary Report on Patentability received for PCT Application No. PCT/US2023/033423, May 15, 2025, 6 pages.

International Preliminary Report on Patentability received for PCT Application No. PCT/US23/033424, May 15, 2025, 07 pages.

U.S. Appl. No. 63/420,804, filed Oct. 31, 2022.
U.S. Appl. No. 63/420,839, filed Oct. 31, 2022.
U.S. Appl. No. 63/420,887, filed Oct. 31, 2022.
U.S. Appl. No. 18/093,498, filed Jan. 5, 2023.
U.S. Appl. No. 18/096,466, filed Jan. 12, 2023.
U.S. Appl. No. 18/830,036, filed Sep. 10, 2024.

Notice of Allowance mailed on May 7, 2025, in U.S. Appl. No. 18/093,498, 16 Pages.

\* cited by examiner

LARGE LANGUAGE MODEL UTTERANCE AUGMENTATION

CROSS-REFERENCE TO RELATED APPLICATIONS

This application claims the benefit of and priority to U.S. Provisional Patent Application Ser. No. 63/420,839 filed on Oct. 31, 2022 and entitled "Large Language Model Utterance Augmentation," and which application is expressly incorporated herein by reference in its entirety.

BACKGROUND

Today's intent detection mechanisms rely on either rule-based regular expressions or on supervised machine learning (ML) techniques with heavy feature engineering like named-entity recognition (NER). Such a mechanism requires brainstorming complex regular expressions or curating massive, labeled datasets containing an exhaustive collection of possible utterances (i.e. ways in which a user can say something to trigger a command) mapped to each "intent" of the system. Along with this list of utterances comes a still larger list of "slot" value examples.

Supervised slot extraction requires manual tagging of slots in the inside-outside-beginning (JOB) format. As a result, this process for intent detection of slotted commands is very tedious, time-consuming, and not scalable. What is needed, therefore, is an improved technique that moves away from the traditional "pre-train and then fine-tune" paradigm and adopts a new paradigm. Furthermore, what is needed is a technique for generating variations of phrases to increase the flexibility of interpreting utterances using the new paradigm. What is further needed is an improved technique for facilitating voice based transcription of certain domains. These various techniques are desirable to provide improved results to a user and to improve the operational efficiency of the computing system.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices, and methods for causing a large language model (LLM) to generate semantically related phrase variations for a phrase that is included in seed data, which is provided to the LLM to generate the semantically related phrase variations.

Some embodiments access an LLM that is generally pre-trained on an arbitrary corpus of language training data. The embodiments feed, as input, seed data that includes multiple phrases that are semantically related to one another and that describe a particular command. When any one of the phrases is received as utterance input, the utterance input triggers execution of the command. The embodiments cause the LLM to generate multiple phrase variations based on the phrases, where each phrase variation is semantically related to the other phrases. When any one of the phrase variations is received as new utterance input, the new utterance input also triggers the execution of the command. The embodiments store, as a listing of phrases, the phrases and the phrase variations in a data storage. The phrases/variations in the listing are identified as being semantically related to one another and are identified as being triggers for executing the command.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
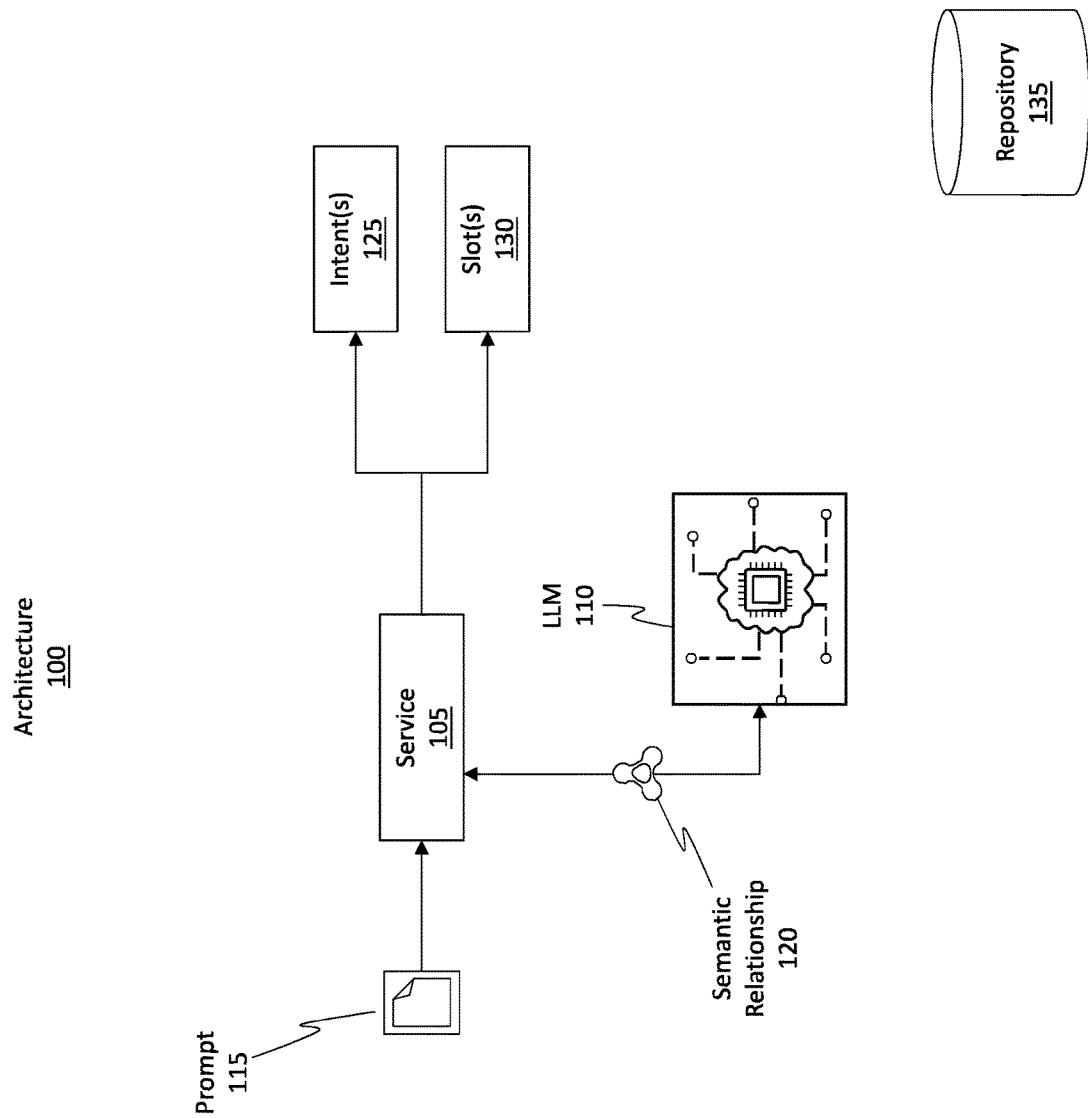
FIG. 1 illustrates an example architecture for performing contextualized intent detection and slot extraction based on a pre-train, prompt, and predict paradigm.

Some embodiments relate to systems, devices, and methods for causing an LLM to generate semantically related phrase variations for a phrase that is included in seed data, which is provided to the LLM to generate the semantically related phrase variations. For instance, some embodiments access an LLM that is generally pre-trained on an arbitrary corpus of language training data. These embodiments feed, as input, seed data that includes one or more phrases that are semantically related to one another and that describe a particular command. When any one of the phrases is received as utterance input, the utterance input triggers execution of the command. The LLM then generates multiple phrase variations based on the phrases, where each phrase variation is semantically related to the other phrases. When any one of the phrase variations is received as new utterance input, the new utterance input also triggers the execution of the command. The embodiments store, as a listing of phrases, the phrases and the phrase variations in a data storage (e.g., a persistent data storage so that progress of previous generations is not lost). The phrases (which includes any phrase variations) in the listing are identified as being semantically related to one another and are identified as being triggers for executing the command.

As used herein, the term "utterance" refers speech where a user says something to trigger performance of an intent. Stated differently, "utterances" are a set of likely spoken phrases mapped to an intent that provides a command or instruction on an activity to perform. As used herein, the term "intent" refers to an identified command that is embedded or included in an utterance. Stated differently, an "intent" corresponds to an action that fulfills a user's spoken request. Intents can optionally have arguments called "slots." As used herein, the term "slot" refers to a parameter or value associated with the intent.

It should be noted that while a majority of this disclosure provides examples within the context of an integrated development environment (IDE), one should appreciate how the disclosed principles can be practiced in other environments and contexts, without limit. An example will be helpful.

Suppose a user speaks the following phrase: "Go to line 5" within the context of an IDE. The spoken phrase "Go to line 5" is an example of an utterance. The "intent" or command associated with this utterance is a "go to" command or action that the computer can perform. The "slot" or parameter associated with this utterance is "line 5," meaning that the computer will navigate to line 5 of the code.

The embodiments are able to parse an utterance into its constituent parts, which include an "intent" and a "slot." From a machine learning perspective, this parsing process can be viewed as a two part process. To illustrate, for an incoming utterance, a machine learning engine is first presented with a classification problem, such as "what intent does this utterance belong to." In other words, the machine learning engine maps an intent to an incoming utterance. Once that classification has been achieved, then the second problem faced by the machine learning engine is an extraction problem. To illustrate, if there are one or more slots associated with the identified intent, is the machine learning engine able to extract those slots from the utterance. Thus, the ability to analyze utterances can optionally be viewed (from the context of machine learning) as being a two part problem that involves classification and extraction. The embodiments improve upon these processes, as described below.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

As mentioned earlier, traditional techniques for identifying intents and slots were prohibitively labor intensive and added significant amounts of manual work. Consequently, those traditional techniques were prone to error because of manual slippage. Furthermore, the traditional techniques were not easily extensible. While those techniques could work for specific input label data that was provided, those techniques performed extremely poorly when unknown utterances were provided, such as ones that deviated from the input label data.

The disclosed embodiments improve over these traditional techniques in numerous ways. One significant benefit of the disclosed embodiments is that they have effectively removed the manual requirement aspect. Now, the embodiments can operate with significantly reduced human input. For instance, techniques are described herein that have removed the requirement for human users to provide large amounts of labeling data or large amounts of input modelling data. Despite the reduction in the amount of input, the disclosed models are still able to learn from the provided data and provide improved results as compared to the traditional techniques. The embodiments also provide a generalized system that is able to learn and adapt over time. With this generalized system, the embodiments can perform quite well, even when unknown utterances are provided.

As another benefit, the disclosed embodiments move away from the traditional "pre-train and fine-tune" approach. The embodiments have shifted, instead, to a "pre-train, prompt, and predict" paradigm, as will be described in more detail in this document. By utilizing this new paradigm, the embodiments are able to significantly improve how utterances are analyzed, how intents are determined from those utterances, and how slots are extracted from those utterances. Furthermore, the embodiments are significantly more flexible in their ability to recognize utterances, intents, and slots as compared to traditional techniques.

The embodiments are also able to beneficially generate variations of phrases that may be uttered. By doing so, an expanded set of related phrases can be stored in an accessible manner. Such phrases can operate as a set of input-output relationships. These relationships can optionally operate as training data for other ML models. In another scenario, when a user utters a phrase, the stored phrases can be consulted to determine whether the uttered phrase is associated with a particular intent. Significant improvements in speed and processing can be realized by practicing these principles.

The embodiments also significantly improve how utterances are transcribed, particularly in the context of an integrated development environment (IDE). Certain words in programming language have inherent, executable meaning within the context of an IDE. Traditional speech to text models fails to attribute the proper meaning to those terms when dictation occurs. The embodiments provide various advantages and benefits in how utterances are analyzed so that proper, contextual meaning is imposed on the terms included in the utterances. Accordingly, these and numerous other benefits will now be described in more detail throughout the remaining sections of this disclosure.

Introduction to the Pre-Train, Prompt, and Predict Paradigm Using Large Language Models A "large language mode" (LLM) is a type of machine learning (ML) algorithm that can recognize human language input and then predict and create variations of that language input. LLMs are often tens of gigabytes in size (though they can be smaller) and can sometimes be trained using petabytes of input data (though less training data can be used). LLMs can also use a large number of parameters. A parameter is a value that the model can change as it learns and grows. Stated differently, a parameter is a portion of the model that is learned over time from historical training data. Parameters generally define the basis or the skill of the model with regards to a particular problem, such as a language analysis problem. Various examples of LLMs can include, but are not limited to, the GPT-3 LLM, the BERT LLM, the OPT-175B LLM, and the upcoming GPT-4 LLM. Of course, there are other types of LLMs.

After an LLM has been trained using initial training data, the LLM can be used in a "zero-shot scenario" as well as in a "few shot scenario." With these scenarios, very little domain-tailored training data (which is distinct from the initial training data provided to the LLM) is provided to the LLM. Despite this small amount of domain-tailored input data, the LLM is nevertheless able to generate output based on the few different input prompts. The phrase "few shot" means that minimal data is provided as training data, whereas "zero-shot" means that the LLM can learn, grow, and recognize new patterns or things that the model was not previously exposed to during the training phase. The performance of an LLM can scale as new parameters are added to the LLM and as new data is provided to it.

With the "pre-train, prompt, and predict" paradigm, the disclosed LLMs are available in a pre-trained state. For instance, an LLM can be used to facilitate the disclosed operations. As alluded to earlier, to be "pre-trained," these LLMs were trained using large volumes of training data. It should be noted that the pre-training for these LLMs is very generic, as in there is no specific aim for the training process; rather, it is performed in a generic manner. The pre-training phase for the traditional techniques, on the other hand, was very targeted and specifically focused towards intent and slot extraction (e.g., if the machine learning observes an utterance, it is trained to identify a specific intent and corresponding slot). Accordingly, the LLMs used herein are generically pre-trained LLMs where numerous different types of language inputs are provided as training data and where the LLMs are not trained using only utterances, intents, and slots. In other words, the disclosed LLMs are pre-trained using one or more arbitrary corpuses of language data.

During the "prompt" phase of the paradigm, the embodiments are able to perform a call to these pre-trained LLMs. Having fed a prompt to the pre-trained LLMs, those LLMs will then generate predictions regarding the intent and slots for an utterance. Regarding this prompt phase, the embodiments can use the "few shot" learning approach. With this approach, the user provides a select number or limited number of expected input and output samples of a specific use-case to the system/service (e.g., an API that feeds the input to the LLM). A sample trigger is also provided to generate a desired output.

A two-pronged approach can be adopted for intent detection of slotted commands. One prong includes the ability to recognize the intent using masked LLMs, such as the BERT LLM or libraries such as NLP.js. Another prong includes the ability to extract the slots from the utterance by querying the LLM (e.g., GPT-3).

With the above approaches, the embodiments provide a select set of prompts to the LLM. In some embodiments, a size of the prompt can be restricted or limited. That is, it is typically the case that the size of the prompt is designed to be less than a maximum size threshold. In some cases, the size of the prompt is dependent on a determined complexity for the intent. More complex intents may utilize larger prompts while less complex intents may utilize smaller prompts.

The LLM learns from these prompts to determine intents and slots. When a new, or previously unseen utterance is provided as input, the LLM is still able to map an intent to that utterance and is also able to extract the slots. The LLM can also associate that intent with the ones provided in the prompt, if they are related. Furthermore, the LLM is able to recognize a context that is associated with the utterance and tailor its output based on that context. As an example, suppose an utterance is received as input in the context of an integrated development environment (IDE). Here, the LLM can recognize that the utterance is received within the context of the IDE, and the LLM can tailor its output based on the identified context. As a specific example, the context can include syntax specific language for the IDE, file extensions that are used by the IDE, and so on.

Regarding the prediction phase, the LLM is able to receive a previously unknown utterance and then predict an intent for that utterance based on the determined context associated with that utterance. Similarly, the LLM is able to predict which slots are included in that utterance. These predictions are performed based on the limited number of prompts that were used to help generalize the understanding of the LLM. Furthermore, even if the utterance does not match a previous record of an utterance known to the LLM, the LLM is still able to extract an intent and slot for that unknown utterance.

Example Architectures

Having just described the new paradigm in a general manner, attention will now be directed to FIG. 1, which illustrates an example architecture 100 that can be used to implement the pre-train, prompt, and predict paradigm described above. Architecture 100 is shown as including a service 105. Service 105 can be any type of service. For instance, service 105 can be a cloud service operating in a cloud environment. In some cases, the service 105 can be a local service operating locally on a computer. In some cases, the service 105 can even be a hybrid or distributed service that is partially implemented in the cloud and that is partially implemented locally.

Service 105 is shown as including or at least being associated with a LLM 110. The service 105 can include an API for communicating with the LLM 110.

The LLM 110 can operate in the cloud or in a data center. In some cases, the LLM 110 may be dedicated for use by the service 105. In some cases, the LLM 110 may be a shared resource. In some cases, the LLM 110 can be operating locally on a computer.

The LLM 110 is a pre-trained LLM. That is, the LLM 110 was pre-trained in the general manner recited previously.

In accordance with the disclosed principles, the service 105 is able to receive a prompt 115, which can optionally include multiple prompts or a batch of prompts. Recall, the size of the prompt 115 is set so as to not exceed the maximum size threshold. The prompt includes any number of prompt phrases that are used to provide additional contextual knowledge to the LLM 110, as will be shown in more detail later. These prompt phrases include various different text or vocabulary to describe a common intent. The prompt phrases also indicate what portion of the phrase constitutes a slot.

The service 105 then provides the prompt 115 to the LLM 110, which analyzes the prompt 115 to identify a semantic relationship 120 between different bodies of text and to optionally generate an additional set of intent(s) 125 and a set of slot(s) 130. These intent(s) 125 and slot(s) 130 are designed to have the same semantic meaning as the ones that were included in the prompt 115. That is, in some cases, the prompt 115 may not include a similar sense as the test data. The fine-tuning of the LLM can be used to teach that. The prompt can be used to direct the LLM to perform intent detection and slot extraction, even if the prompt and extract sections are different.

Figure 2:
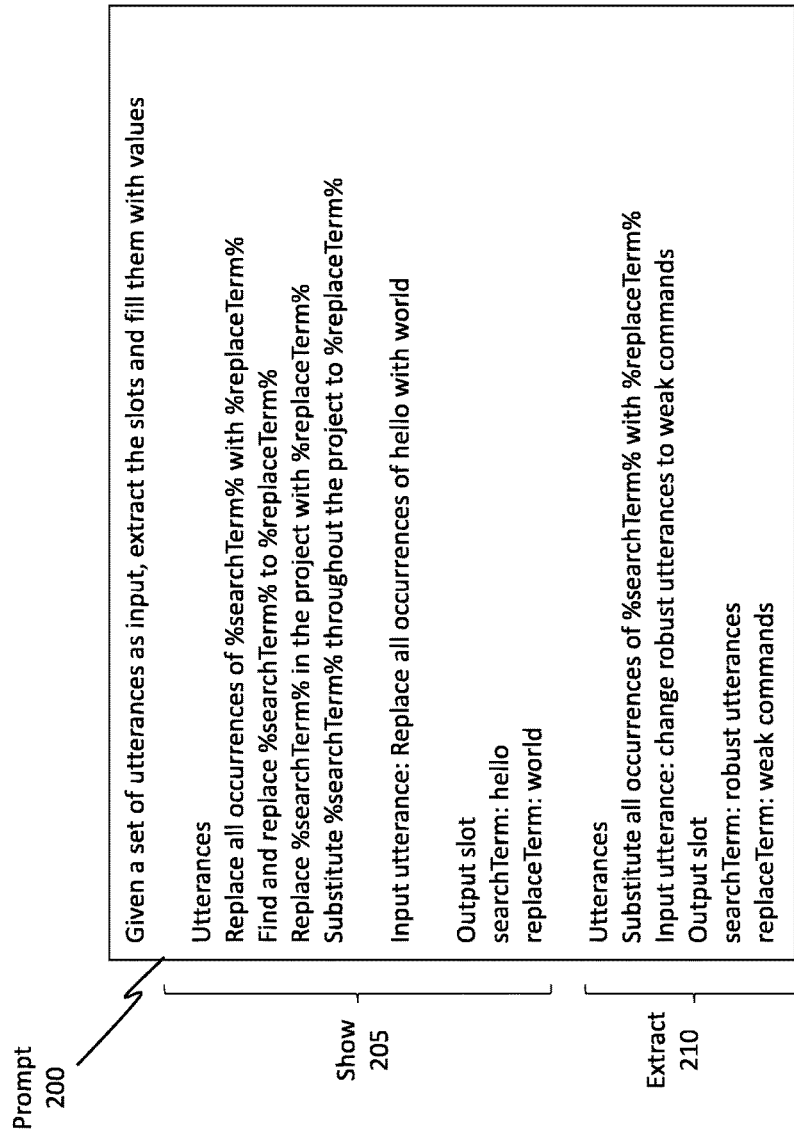
FIG. 2 illustrates an example of a prompt that can be provided to a large language model (LLM).

That is, the LLM 110 can generate additional phrases that comprise these intent(s) 125 and slot(s) 130. These new phrases might use different vocabulary, but the semantic meaning for those phrases corresponds to the semantic meaning of the phrases included in the prompt 115. Stated differently, the intents (e.g., those generated by the LLM 110 and those included in the prompt 115) all align and match with one another. Optionally, these intent(s) 125 and slot(s) 130 can be stored in a repository 135 for subsequent reference or use. An example will help provide some better context. FIG. 2 provides such an example.

FIG. 2 shows an example prompt 200. This prompt 200 is a text-based file that can be curated by a human user. The prompt 200 includes a number of text phrases that are semantically related to one another and that all correspond to the same intent.

To illustrate, the prompt 200 is shown as including the following phrases: "Replace all occurrences of %searchTerm% with %replaceTerm%"; "Find and replace %searchTerm% to %replaceTerm%"; "replace %searchTerm% in the project with %replaceTerm%"; and "Substitute %searchTerm% throughout the project to %replaceTerm%". These various different phrases correspond to utterances that a user could optionally speak within the context of an IDE. Of course, different phrases can be spoken in different contextual scenarios.

In this example scenario, the prompt 200 includes four specified variations. Depending on the complexity of the intent, however, the prompt 200 may include more or fewer than four different generalization phrases. Thus, the complexity of the prompt can optionally depend on the complexity of the intent on which the LLM is being generalized. In this example scenario, four phrases are sufficient to enable the LLM to be generalized with regard to generating a prediction. With traditional machine learning techniques, those machine learning algorithms would require many thousands of examples in order to produce a workable output result.

Notice, all of these phrases are semantically related to one another in that they all are associated with the same "intent" or "command." In this example scenario, these phrases all represent various different techniques for performing a "find and replace" command/intent. The terms surrounded by the "%" differentiator flags represent slots. That is, both %searchTerm% and %replaceTerm% are considered to be slots or parameters of the intent.

These phrases are fed as input to the service 105 of FIG. 1. The service 105 can include an API to communicate with the LLM 110. The service 105 passes these phrases as input to the LLM 110. The LLM 110 reviews these phrases and identifies the semantic meaning and correlation between these different variations of the "find and replace" intent. The LLM 110 can then learn from the prompt 200. That is, given the semantic meaning identified from within the prompt 200, the LLM 110 is able to generate additional text/phrases that could also conform with the semantic meaning of the phrases provided in the prompt 200.

The prompt 200 is also shown as including an "input utterance" text field, which operates as an example for the LLM 110. Here, this input utterance includes the following text: "Replace all occurrences of hello with world."

The prompt 200 identifies one slot as "hello" (e.g., the searchTerm). The prompt 200 identifies a second slot as "world" (e.g., the replaceTerm). This prompt 200 is effectively informing the LLM 110 what the slots are in the "Input utterance" that is provided above.

FIG. 2 labels a section of the prompt 200 as a "show" 205. In other words, from this prompt 200, a user is showing the LLM 110 what it is desired for the LLM 110 to do. The LLM 110 is then tasked with further completing or filling in this prompt 200 with additional generalizations/phrases that are generated based on new utterances spoken by the user. That is, the last two lines in the section of the prompt 200 labeled as "extract" 210 corresponds to data that is generated by the LLM (the other text is entered or prompted by the user) and that can optionally be inserted into the prompt 200 to further fill it in.

By way of further clarification, in this specific example, a user has spoken the following phrase: "change robust utterances to weak commands." The service 105 receives this utterance and converts it from speech to text. The utterance text is then provided to the LLM 110.

The LLM 110 analyzes the utterance text and attempts to identify an intent and a slot. In this cases, the LLM 110 determines that the utterance text is the following: "Substitute all occurrences of %searchTerm% with %replaceTerm%". The "intent" is "find and replace." The LLM also identifies the slots. In this case, the %searchTerm% slot has the value "robust utterances", and the %replaceTerm% slot has the value "weak commands".

As shown in FIG. 2, the LLM can optionally append this information to the prompt 200, as shown by the extract 210 section of the prompt 200. In this manner, the prompt 200 can optionally serve as a running log for recording various alternative techniques for inciting or triggering the "Find and replace" command or intent. The prompt 200 can optionally be stored in the repository 135.

As more utterances are generated, the LLM 110 is able to determine the semantic meaning of those utterances, extract an intent, and extract a slot. The LLM 110 can then associate that utterance with other utterances that share a same semantic meaning. Thus, even if the actual language/vocabulary used in one utterance is different than the language/vocabulary in other utterances, the LLM is nevertheless still able to identify a relationship between the utterances because the intents of those utterances are determined to correspond to one another.

By way of further clarification, in this example, the user uttered the phrase "change robust utterances to weak commands." None of the previous prompt phrases included that exact language. Despite none of the previous prompt phrases having this exact language, the LLM was nevertheless able to determine that the underlying intent of the phrase "change robust utterances to weak commands" corresponded to a find and replace command. The LLM then formed a relationship between this new utterance and the prompt phrases included in the prompt 200. Furthermore, the LLM supplemented, augmented, or added to the prompt 200 by including this new phrase, its determined intent (e.g., "Substitute all occurrences of %searchTerm% with %replaceTerm%"), and its determined slots. In this way, the LLM is able to generalize the find and replace command so that different utterances, or different methods of triggering the same command, will all be associated with one another in the prompt 200.

It should be appreciated how other prompts can be provided for other intents, particularly for a specific context. As examples only, another prompt can be generated for a "close" action, such as a close window action. Yet another prompt can be generated for a go-to action, and so on and so forth. The benefits the LLM provides is being able to form relationships between different phrases or vocabulary, despite those phrases or vocabulary being different. That is, despite the fact that a combination of words might be different, the LLM can still associate different combinations of words together based on their underlying semantic meaning. In this sense, the LLM can find variations in the vocabulary that people utter, and the LLM can form relationships between those variations. With these newly formed relationships, the LLM can fill in a prompt/document to record the various different relationships. Hence, the disclosed embodiments relate to a scenario where a user can "show" the LLM what to do as opposed to a "do this" type of a model.

Figure 3:
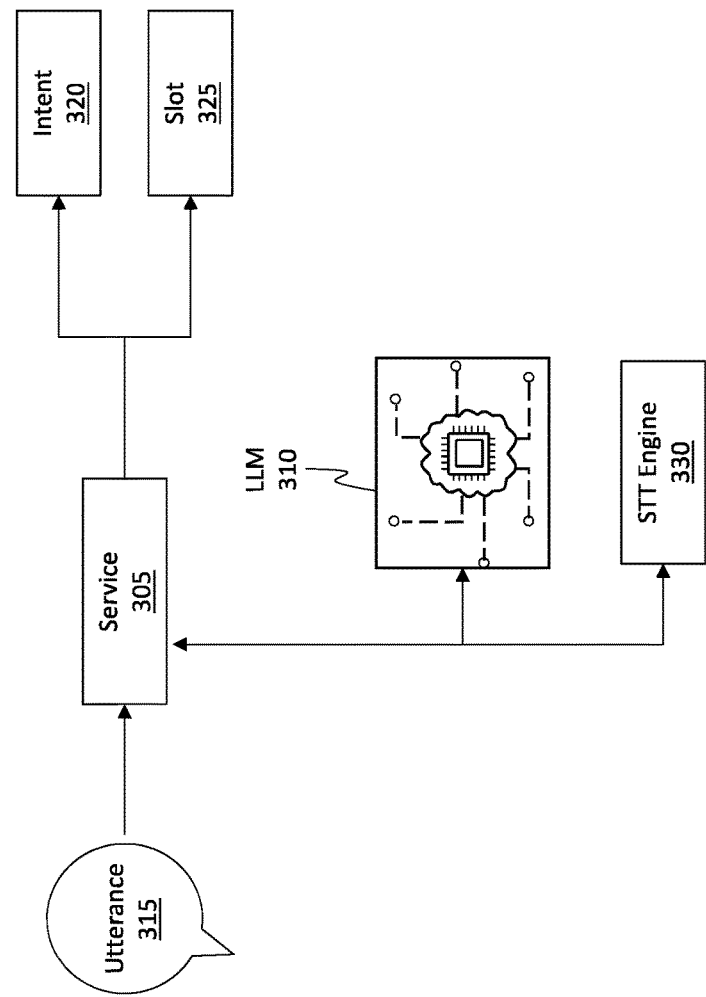
FIG. 3 illustrates an expansion of the architecture, where the architecture is now being provided utterance input for analysis.

FIG. 3 shows an example architecture 300 that is supplemental to the architecture 100 of FIG. 1. Architecture 300 includes a service 305 and an LLM 310, which are representative of the service 105 and LLM 110 from FIG. 1, respectively. The service 305 is able to receive an utterance 315, convert that utterance to text, and then pass the text to the LLM 310. In accordance with the principles recited above, the LLM 310 is then able to determine an intent 320 and a slot 325 for the utterance 315. Optionally, the LLM 310 can append the intent 320 and the slot 325 to the prompt 115 of FIG. 1 and can store the prompt 115 in the repository 135. Architecture 3 also shows the use of a speech to text (STT) engine 330 or STT module. Further details on this STT engine 330 will be provided shortly. Briefly, however, the STT engine 330 receives audio input and transcribes that audio input to generate text output. The text output is what is provided to the LLM 310.

Speech to Text

There is a significant amount of variability in utterances when voice is used as a modality. For instance, using voice based commands (i.e. utterances) opens the door to many examples that might not make sense, as will be described in more detail shortly. Such problems are typically not surfaced when text is used (unless there are misspellings) because text has a definitive structure.

In particular, it is desirable to not extract slots that are meaningless to the current context. As an example, suppose a user wants to open a file named "main.py". Current state of the art speech to text (STT) modules might recognize the utterance as "main dot pie". One can appreciate how this transcription problem does not surface in text input scenarios.

While traditional STT modules are quite good at transcribing text, they are deficient in interpreting what is spoken in view of the context in which the words are being uttered. For instance, if the phrase "open main.py" was spoken in the context of an IDE, what should happen is that the file named "main.py" should be opened. The traditional STT module, however, would not properly be able to interpret the statement in view of the context, and an incorrect slot would be determined. The cost of using incorrect slots can be quite high. Thus, it is desirable to provide correct identifications for slots from utterances, particularly in view of the context in which those utterances are being spoken. The disclosed embodiments help facilitate such operations.

Figure 4:
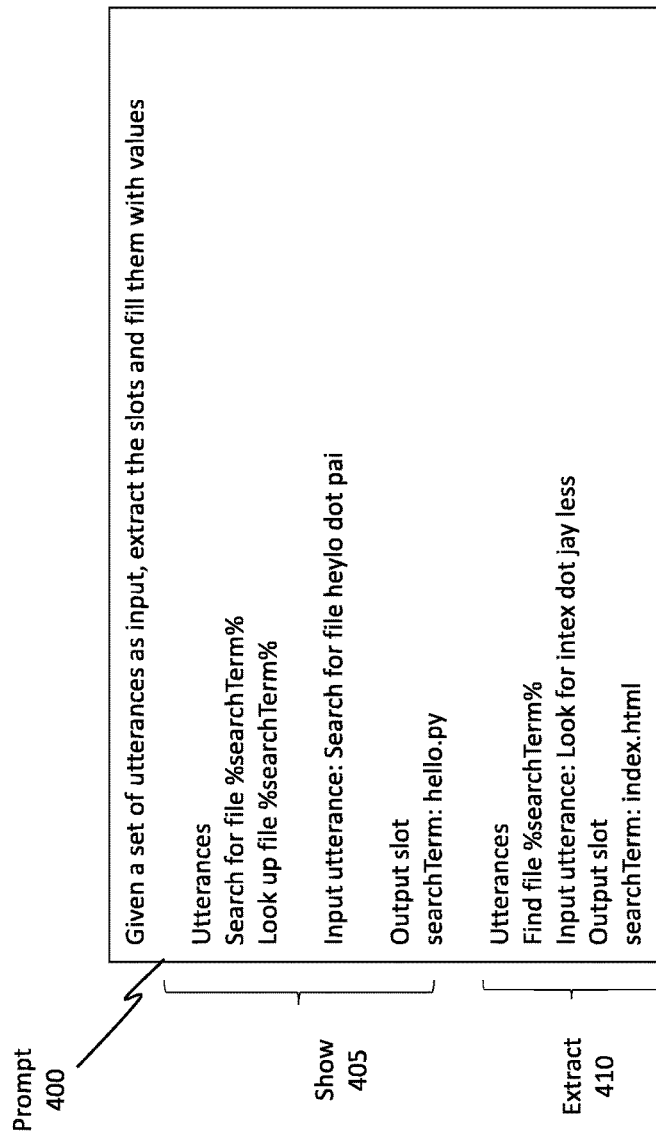
FIG. 4 illustrates another example of a prompt, where this prompt includes text that is generated by a speech to text engine.

FIG. 4 shows an example prompt 400 that includes a number of prompt utterance phrases typed in by the user. These phrases include the following phrases: "Search for file %searchTerm%" and "Look up file %searchTerm%".

In addition to those phrases, the prompt 400 includes an STT generated phrase, which is the following: "Search for file heylo dot pai". To be clear, this phrase is language that would be generated by an STT module (e.g., the STT engine 330 from FIG. 3) and is generated based on an actual utterance spoken by a user. The actual phrase spoken by the user was the following: "Search for file hello.py". The STT module interpreted the spoken phrase incorrectly and generated the following text: "Search for file heylo dot pai". The embodiments are able to provide additional context to the LLM via the prompt 400, where this context is the language that an STT engine might generate and how that language should be correctly interpreted, as discussed below.

In the show 405 portion of the prompt 400, the user is providing instructions to the LLM that even when the slot "heylo dot pai" is received as input, that input should be recognized as being a variant of the actual slot "hello.py". To be clear, the user has entered what the slot should have actually read with the following line: "searchTerm: hello.py". This particular prompt 400 is generated in order to incorporate cases where the STT module might not have correctly transcribed an utterance spoken by a user. This new line item in the prompt 400 is considered to be additional context that can be provided to the LLM.

Now, in this example, a previously unseen utterance is provided to the service and LLM. That unseen utterance is the following (which is also an STT generated output): "Look for intex dot jay less". The actual language spoken by the user was the following: "Look for index.js".

In this example scenario, the LLM has correctly determined the intent, which is "Find file %searchTerm%". The LLM also correctly identified which text in the utterance corresponds to the slot; in this case the %searchTerm% slot corresponds to the text "intex dot jay less."

Unfortunately, however, the LLM interpreted, mapped, predicted, or generalized the slot language "intext dot jay less" incorrectly and generated the following incorrect slot: "index.html". The LLM correctly predicted "intex" as being "index", but the LLM incorrectly predicted "dot jay less" as being ".html". The correct prediction should have been "dot jay less" as being ".js". This prediction problem arises because the LLM is not leveraging the knowledge of files that are currently available or that can be used within the context of the IDE. This incorrect prediction is shown by the extract 410 portion of the prompt 400. That extract 410 should be deleted or not included in the prompt 400

It is desirable to be able to consult those files when generating a prediction that is generally associated with the use of files in the IDE. What the LLM was previously doing was that it generated its prediction based on an arbitrary set of files that were not constrained, or rather prioritized, based on a domain (e.g., the IDE domain). As a result, the LLM was unboundedly searching or generating variation predictions that could potentially map to the slot "dot jay less".

The disclosed embodiments are able to beneficially leverage the information that is available within the context in which the utterances are being spoken. For instance, if the utterances are being spoken within the context of an IDE, then the embodiments are able to utilize the information that is available from the IDE to generalize the predictions. For example, the embodiments can leverage the fact that there are a specific set of files in the working directory of the IDE, and the IDE (currently) is able to open only those files. Thus, the embodiments are able to guide the predictions of the LLM based on an identified context, which can be added to the prompt for delivery to the LLM. For instance, the embodiments can cause the LLM to identify the specific set of files in the working directory, and make predictions based on that information.

Figure 5:
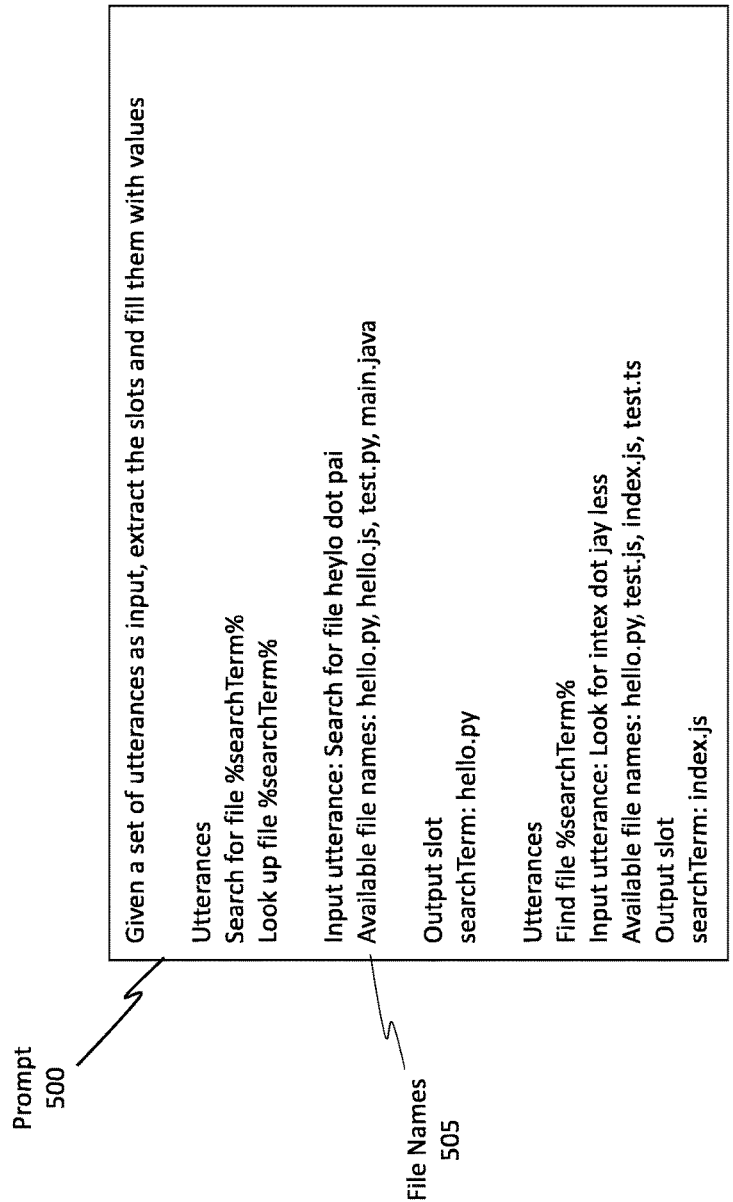
FIG. 5 illustrates another example of a prompt, where this prompt is structured to include additional contextual information that will be provided to the LLM.

FIG. 5 shows a modification to the previous prompt, now in the form of prompt 500. Prompt 500 is now showing a line item labeled file names 505. The file names 505 includes the following prompt statement: "Available file names: hello.py, hello.js, test.py, main.java". The file names 505 is a listing of file names that are available in the IDE, and the prompt 500 is instructing the LLM to consult the listing of files in the IDE when generating its predictions. The supplemented prompt 500 is thus providing additional knowledge or "context" for the LLM to use. Notice, the output of the LLM now shows that the identified searchTerm is correctly predicted as being "index.js". Note, the embodiments are not limiting the scope of search for the LLM; rather, the embodiments are providing enhanced contextual information to enable the LLM to provide a better prediction using a more complete set of knowledge.

That is to say, the embodiments can supplement the contextual understanding of the LLM by providing additional context within the prompt 500. Stated differently, additional context can be provided to the LLM by adding information to the prompt 500. In effect, the context included in the prompt 500 can be used to supplement any context that the LLM has identified (e.g., perhaps an IDE).

With this example, the prompt is informing the LLM that the LLM should not generally pull file name information from its generalized base of knowledge, information, or context. Instead, the prompt is instructing the LLM that the additional context provided within the bounds of the prompt 500 should be given a weighted preference over the LLM's generalized knowledge bank. In this case, the "Available file names" should be given preferential treatment by the LLM. Consequently, the LLM will disproportionately weigh the contents of the prompt 500 over its generalized knowledge bank or context.

It should be noted that the LLM can identify slots even when a slot value is not specified in the prompt 500. For instance, supposing that the prompt 500 omitted the "hello.js" file name from the "Available file names" section, the LLM would still be able to generate the "index.js" output. Despite the ".js" extension not being included in the prompt 500, the LLM is still made aware of various different file extension names. The LLM can consult these file name extensions and then identify a next-likely file name extension that would map to the "dot jay less" text. With regard to prompt 400 of FIG. 4, the LLM previously used the ".html" file name extension because, based on its current knowledge bank, the ".html" file name extension was the most common file name extension during rollout. With the enhanced, supplemental information in prompt 500, however, the LLM can prioritize other file name extensions over the ones that were ranked highest based on its generalized knowledge.

In this manner, the embodiments are directed to a technique for providing contextualized intent and slot extraction, where additional context is provided within the prompt sent to the LLM. The embodiments provide mechanisms for performing prompt crafting, where a prompt can be engineered or designed in a manner so as to provide supplemental, enhanced, or augmented contextual awareness to the LLM. Additionally, the LLMs do not need to be trained regarding the specific formatting of a prompt. Indeed, the embodiments provide a heightened level of flexibility in enabling one prompt to be swapped out for another prompt while still enabling the LLM to recognize the new prompt.

The disclosed principles can be used in various different scenarios. As one example only, consider a scenario where a user is desirous to generate code for an application. Here, the user is currently working in an IDE. The disclosed principles can simulate or operate as a virtual programming assistant that allows the user to write code in a collaborative manner. Traditional coding techniques, even voice activated ones, were extremely rigid and required strict adherence to a programming language's specific syntax.

The disclosed embodiments, on the other hand, provide an enhanced level of flexibility with regard to entering input (e.g., in this case, actual code). For instance, the human developer can speak various different utterances. The service is able to receive these utterances, convert them to text, and then feed the text as input to the LLM. Based on prompts that have been provided to the LLM previously, the LLM is able to analyze the text-based utterance, extract the intent from that utterance, and also extract the slots from that utterance. Under the direction of the human user, the LLM can then generate lines of code based on the spoken utterance. Consequently, the service and LLM can operate as a virtual programming assistant to the user. Furthermore, this technique can be used to control the code editor as well.

One can appreciate how such an assistant can provide substantial benefits to users as well as to various technical fields, such as perhaps the programming technical field. For instance, a human user now does not need to fully understand the strict syntax and programming rules that a development language may require. Instead, so long as the user understands the basic mechanics of programming logic, the user can provide his/her "intent" to the service, and the service and LLM can assist in generating the actual code. Consequently, the user's knowledge of programming syntax can essentially be a language agnostic understanding.

The embodiments also enable a very natural and intuitive interaction between the user and the service. Accordingly, the embodiments enable a user to retain control over the programming experience while also provide a collaborative tool to help with that programming activity. The disclosed service provides options for the user to choose from, thereby enabling the user to remain in control of the process.

Furthermore, the disclosed embodiments can assist users who may have physical deficiencies, such as perhaps slurring of speak or typing mobility issues. In a scenario where a user slurs his/her speech, the LLM can be generalized, via the prompts, to understand the speech patterns of the user and generate or predict output based on a limited set of prompts.

As yet another example, suppose the user used the service to help with the generation of a number of lines of code. The user can then speak an utterance, such as perhaps the following: "Explain what is happening in lines 3 to 5." The embodiments are able to receive this utterance, convert it to text, and then pass it to the LLM. The LLM can extract an intent from that utterance. In this example scenario, the intent is an "explain" command detailing what is occurring, programmatically, in a portion of code. The slot values would be number 3 and number 5. Stated differently, the slots are the numbers 3 and 5, and the intent is "explain between lines" (e.g., between lines 3 and 5). The service (which includes the LLM; for brevity purposes, reference to "service" should be viewed as also including the LLM) can then generate an explanation as to what is programmatically occurring at lines 3 to 5.

Example Method(s)

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
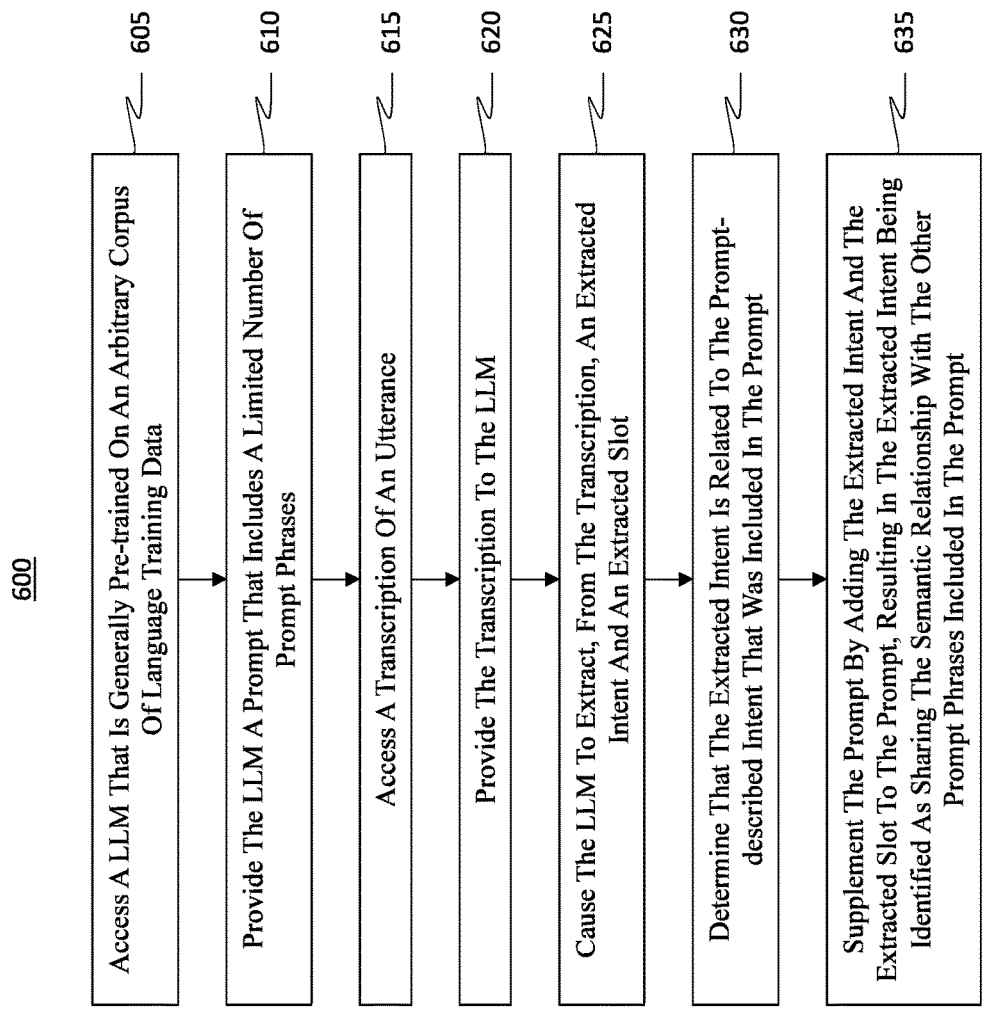
FIG. 6 illustrates a flowchart of an example method for performing contextualized intent and slot extraction.

Attention will now be directed to FIG. 6, which illustrates a flowchart of an example method 600 for performing contextualized intent and slot extraction using a large language model (LLM). Method 600 can be implemented using the architectures 100 of FIG. 1 and architecture 300 of FIG. 3; furthermore, method 600 can be performed by the service 105/305.

Method 600 includes an act (act 605) of accessing a LLM (e.g., LLM 110 of FIG. 1) that is generally pre-trained on an arbitrary corpus of language training data. Any type of generalized, non-specific training data may have been used to train the LLM.

Act 610 includes providing the LLM a prompt (e.g., prompt 115) that includes a limited number of prompt phrases. In some cases, the number of prompt phrases that are included in the prompt is based on a determined complexity level for an intent that is described in the prompt. In some cases, the number of prompt phrases is between 1 and about 20.

The prompt phrases share a semantic relationship with one another. That is, they correspond to a prompt-described intent. As an example, it may be the cases that the different prompt phrases correspond to the following command/ intent: "go to line x." The prompt phrases use different vocabulary to describe the prompt-described intent. There are different ways to verbally recount this action using different vocabulary. Some examples ways include, "navigate to"; "make line x active"; "emphasize line x"; and so on.

Act 615 includes accessing a transcription of an utterance. The utterance may have been received at or processed by an STT engine, and the STT engine generates the transcription of the utterance.

Act 620 includes providing the transcription to the LLM. For instance, the utterance 315 of FIG. 3 is shown as being provided by the service 305 to the LLM 310.

Act 625 includes causing the LLM to extract, from the transcription, an extracted intent and an extracted slot. Intent 320 and slot 325 from FIG. 3 are representative.

Act 630 includes determining that the extracted intent is related to the prompt-described intent that was included in the prompt. With reference to the previous "go to" example, it may be the case that the transcription of the utterance included the following text: "place the cursor at line x." The LLM is able to analyze this text and determine the "intent" of the text. In this case, the LLM can predict that the intent appears to be a "go to" command.

Act 635 includes supplementing the prompt by adding the extracted intent and the extracted slot to the prompt, resulting in the extracted intent being identified as sharing the semantic relationship with the other prompt phrases included in the prompt. For instance, the prompt, which included the "go to" language, can now be supplemented with the "place the cursor at line x" language. Doing so expands the knowledge base or context of the LLM and will further enable the LLM to analyze other phrases that portray a similar intent.

Accordingly, the disclosed embodiments are directed to various techniques for performing contextualized intent and slot extraction. Additional context can be provided to the LLM within a prompt itself, such as was previously described with the file name extension example. The embodiments are able to perpetually build up the knowledge base of the LLM so the LLM can generalize even more predictions and variations and subsequently recognize those variations.

LLM-Based Utterance Augmentation

As indicated above, one of the benefits the disclosed embodiments provide is the ability to generate variations of a body of text. One of the problems with traditional machine learning techniques, is that these techniques required extensive user interaction in order to check and verify the variations were correct. The disclosed embodiments improve upon those techniques by significantly minimizing the level of human involvement. The disclosed embodiments also solve problems related to a lack of utterance input-output relationships that can be fed to other ML models that are distinct from LLM models. Historically, these other ML models required extensive amounts of input-output relationship data in order to be sufficiently trained to generate new variations. Those input-output relationships previously had to be handcrafted by a human user. The disclosed embodiments are able to use an LLM to generate an initial set of utterance input-output relationships, which can then be fed as input into a different ML model. Optionally, the embodiments can feed the seed data to the same LLM itself, and the LLM can recursively generate more variations until a stopping criteria (e.g., similar suggestions after a point) is reached.

Figure 7:
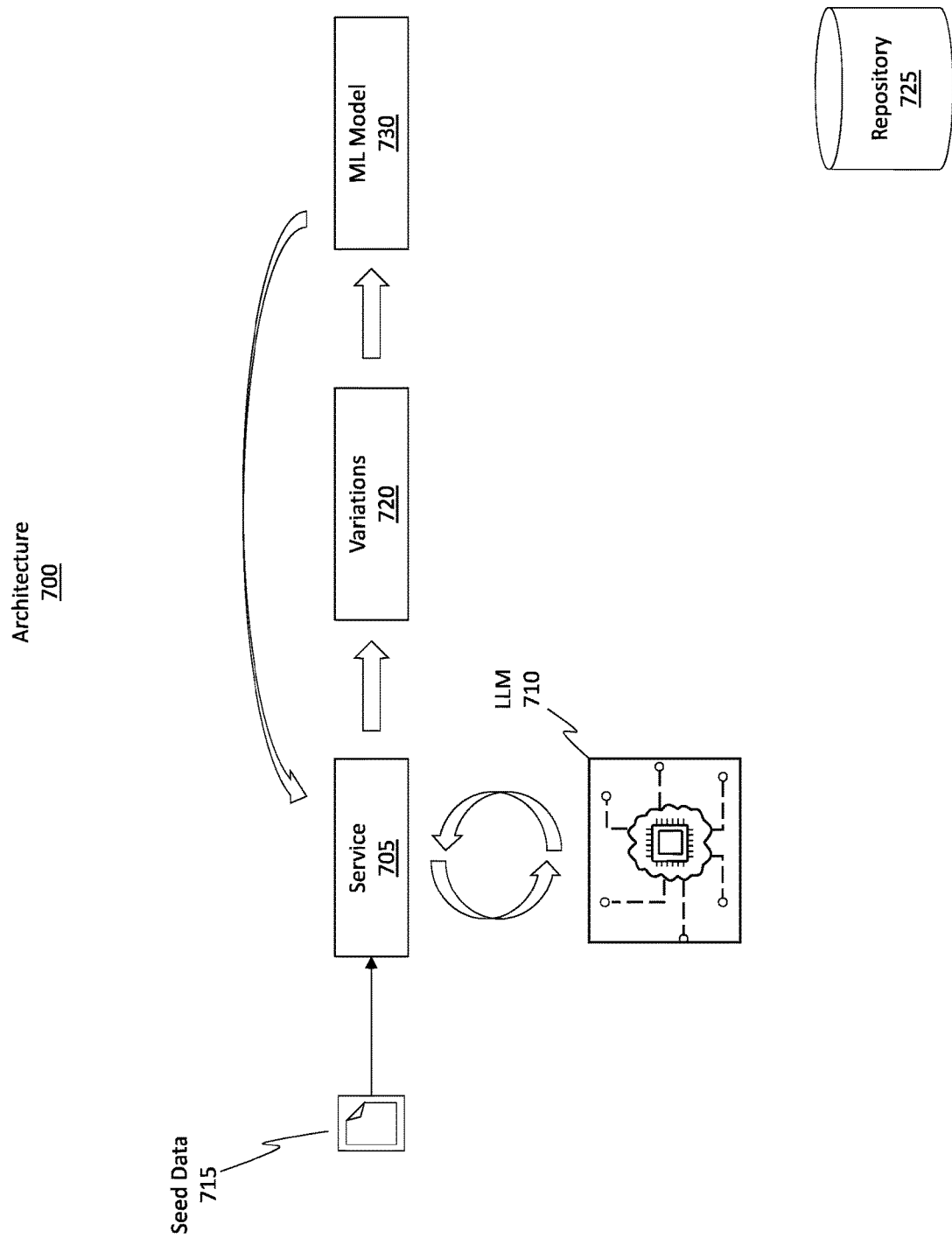
FIG. 7 illustrates an example architecture that is structured to generate variations of phrases, including a feedback loop between the service and the LLM and the service and the ML model.
Figure 8:
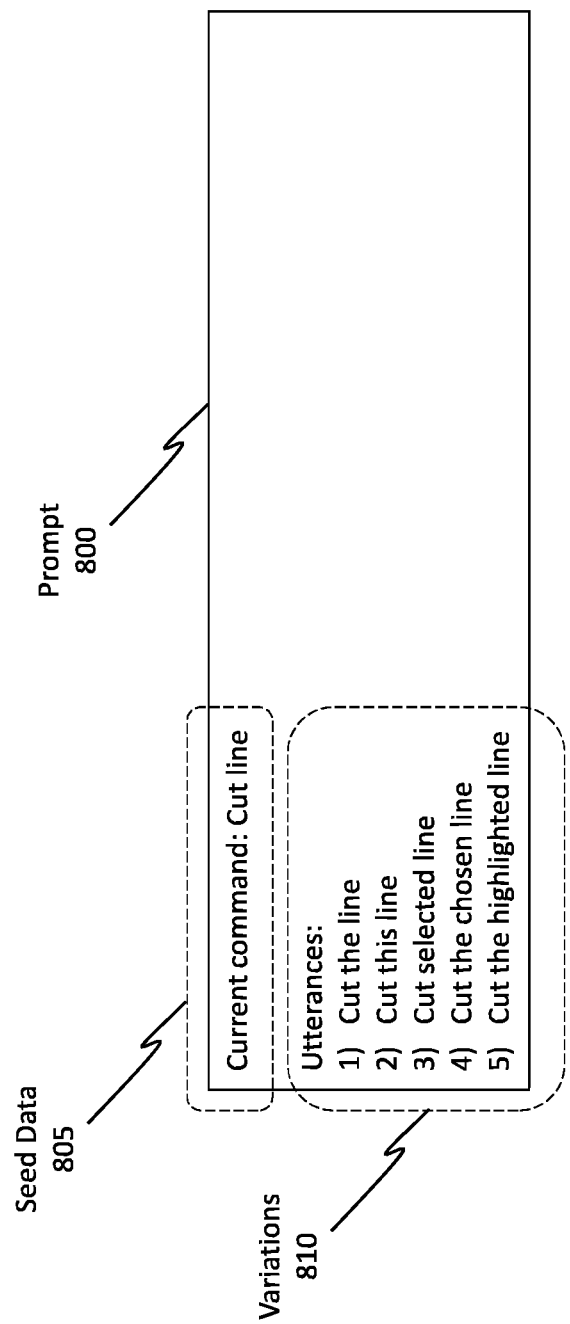
FIG. 8 illustrates an example of seed data that can be used to prompt an LLM.

The disclosed embodiments are able to provide "seed data" to the LLM. The "seed data" represents a baseline descriptor or a single line descriptor for a particular command. The LLM receives this seed data and then generates any number of different variations for how that command can be uttered by a user. As a simple example, suppose the seed data comprised the following text: "cut line 8 and paste it in line 3". In accordance with the disclosed principles, the LLM is structured to generate multiple different variations of how this command can potentially be uttered by a user. As some non-limiting examples, some variations include (but certainly are not limited to) the following: "move line 8 to line 3"; "copy line 8 and paste it in line 3 then delete line 8"; "remove line 8 and paste it in line 3". There are many different ways of expressing this same semantic meaning or command. The LLM is structured to generate these various different potential utterances and then record them in a repository. These variations are all linked to one another and share a common relationship. In this manner, the embodiments are able to perform utterance augmentation, or the generation of variations of an utterance. FIGS. 7 and 8 are representative.

FIG. 7 shows an example architecture 700 that is similar to the architectures mentioned previously in that the architecture 700 includes a service 705 and a LLM 710, both of which are configured to operate in the manner described previously. In this example scenario, the service 705 is now being provided with seed data 715, which can include one or more phrases associated with a particular command. The service 705 passes this seed data 715 to the LLM 710 along with an objective that the LLM 710 is to generate different variations 720 of the phrases included in the seed data 715. In some cases, the LLM 710 may be tasked with generating a select number of phrases, such as perhaps 5, 10, 15, 20, or more than 20 each iteration. In some instances, the LLM 710 is tasked with generating as many phrases as it can within a designated time period (e.g., run for 5 seconds and output how many variations it can in those 5 seconds). The service 705 can optionally cause the LLM 710 to run multiple different times, perhaps under the guidance of the user. For instance, the LLM 710 can generate a number of variations 720. The service 705 can then submit those phrases for review by the user to ensure the user agrees with the variations 720 generated by the LLM 710. If the user desires more variations to be generated, the service 705 can trigger the LLM 710 to generate more variations. Those variations 720 can then be stored in a repository 725, with linkages or relationships formed between the variations 720. As will be discussed in more detail later, a machine learning (ML) model 730 that is distinct from the LLM 710 can also be included in the architecture 700.

FIG. 8 shows an example prompt 800, which can optionally be structured or formatted or can operate in the same manner as the prompts that were described earlier. This prompt 800 is shown as including the seed data 805, which specifies the following command: "Cut line." The LLM was provided this seed data 805 and has generated the following variations 810: "Cut the line"; "Cut this line"; "Cut selected line"; "Cut the chosen line"; and "Cut the highlighted line". These variations can optionally be appended to or added to the prompt 800 as a log record of the variations and seed data for this command. That is, the prompt 800 can operate as a scalable or extendable record of seed data and variations.

The LLM thus generates a listing of available phrases or utterances that a user can speak in order to invoke the "cut line" command. Similar operations can be performed for any other command. In this sense, the embodiments are able to generate a rich repository of numerous different methodologies or manners of speech that can be used to trigger the execution of a particular command. Therefore, later on, when a user is speaking and desires to invoke the "cut line" command, any one of the phrases listed above (as well as any other phrase that has been previously generated or that is optionally interpreted on the fly) can be used to trigger the execution of that command.

In some cases, after the LLM is used to generate these different phrases, the embodiments can optionally refrain from further relying on the LLM when receiving and analyzing utterance input from a user. For instance, if the LLM builds up a listing of variations for commands, the embodiments can refrain from further using the LLM when the user is actually speaking because there is a high likelihood that one of the phrases the user will speak has already been generated by the LLM and can already be used to trigger the execution of a command. Dozens, hundreds, or perhaps even thousands of variations can be pre-generated and retained by the embodiments. These pre-generated variations can then be consulted when the user is uttering commands. In one example scenario, the goal of the utterance augmentation may be to generate enough variations of utterances for intent detection; the goal does not necessarily need to be the generation of an exhaustive set.

Accordingly, the embodiments are able to generate different ways of saying a same intent or command. Once a threshold number of those variations are generated, the embodiments can elect to not consult the LLM when an utterance is received because the embodiments likely have an understanding as to what command the user is trying to invoke. That is, the embodiments have vetted these different variations of this specific utterance during the generation phase described above. As a consequence, the embodiments are able to refrain from relying on an external model for validation. Instead, the embodiments have effectively created a giant hash map for a command. That is, the listing of phrases can optionally represent a hash map for the command, where the hash map reflects different utterance inputs that are available to trigger execution of the command. If an utterance is detected as being included in the listing of generated phrases, then the embodiments can beneficially reduce processing time by avoiding having to further consult with the LLM.

Optionally, this listing of utterance variations can also be used to train a smaller scale machine learning model. This smaller ML model (e.g., ML model 730 from FIG. 7) can be tasked with generating even more variations. Thus, the LLM can be used to generate an initial base set of variations. Stated differently, the machine generated variations of the seed can act as the next seed to the LLM (or perhaps to another LLM) to generate even more variations in a recursive fashion.

Optionally, a subsequent ML model, which is distinct from a LLM model, can then use the initial base set of variations to optionally generate even more variations. Stated differently, the LLM can be used to generate an initial set of input-output relationships in the form of the initial listing of variations. Those input-output relationships can then be fed as input into a different ML model for further generation of variations. Previously, a human user was required to generate these input-output relationships. Now, however, the LLM can be used to generate the input-output relationships for the ML model to operate on. The human can now act as a verifier of output as opposed to a generator of input.

When the LLM is tasked with generating additional variations after having already generated some variations, some embodiments can use the variations generated by the LLM as new seed data for the LLM. For instance, suppose the LLM has generated the following variations: "Cut the line"; "Cut this line"; and "Cut selected line". To be clear, these phrases are ones that the LLM has generated. If the LLM is requested by the service to generate additional variations, some embodiments will feed in the previous first variation generated by the LLM as seed data to spur or trigger the generation of new variations. For instance, the phrase "Cut the line" can be provided as seed data. Additionally, the other two phrases "Cut this line" and "Cut selected line" can also be fed as seed data to the LLM. Thus, in some cases, the LLM's own output can be fed as input into the LLM to trigger the generation of additional variations.

In some cases, the embodiments perform fuzzy checks and can perform filtering to remove duplicate phrases. A fuzzy check or fuzzy search relates to a searching technique for finding strings that have a particular pattern or whose pattern is sufficiently similar to a designated pattern. The fuzzy check can be performed to check for spelling mistakes, grammar mistakes, or syntax mistakes.

The data can also be persisted to storage. If a user finishes but then subsequently desires to generate more variations, the data file comprising the variations can still be accessed and used as seed data for subsequent iterations with the LLM.

Accordingly, a seed file can be crafted to include a command and a descriptor for that command, where the descriptor is one or more phrases that can be used to trigger the execution of that command. The seed file is fed as input to an LLM. Optionally, a prompt can also be provided to the LLM to instruct the LLM on what to do with the seed file. For instance, the prompt can be tailored to instruct the LLM to generate variation phrases that, when uttered by a user, can also be used to trigger the execution of the command. Some example language that can be included in the prompt can comprise the following: (i) "Generate 5 other natural language ways to say the following utterances relating to IDE actions in under 10 words"; (ii) a command; and (iii) one or more example phrases for the command. Of course, the prompt can be crafted in alternative ways, such as by modifying the number of alternative phrases that is desired and/or by modifying the word count.

These variation phrases or phrase permutations are semantically related to the descriptor phrase(s) that were included in the seed file. Any number of variations can be generated. In effect, the embodiments generate a large number of input-output relationships that can optionally be used as input for other ML models.

Optionally, some embodiments also incorporate the use of a stopping criteria. For instance, if the LLM repeatedly generates the same output, then the embodiments are able to detect such a condition and stop the LLM from continued processing. The human user can also determine when to stop the LLM processing.

Based on the above description, one can also observe how the disclosed principles can optionally be used in the domain of image processing. That is, the above domains were generally focused on text analysis. That being said, the disclosed principles can also be used in the domain of image analysis. For instance, the principles can be used for facial recognition, object recognition, or image segmentation. Images can be transformed, such as by changing the saturation, hue, and other characteristics. A single image can be provided as a seed image, but variations of that image can be generated. For instance, suppose a visible light image is provided as seed data. The embodiments can optionally use that seed data to generate images reflective of different camera modalities, such as perhaps an image generated by a low light camera or an image generated by a thermal camera. By feeding in a visible light image, the embodiments can generate corresponding images that appear as if they were generated by a different camera type or modality. Similarly, other characteristics can also be modified. Perspectives, viewpoints, or even coordinate relationships (e.g., flip vertically, horizontally, rotation, etc.) can also be modified by the LLM, or rather a model that is similar to a LLM but that is applicable to image analysis. For instance, the embodiments can use a DALL-E 2 model, which takes a textual prompt and generates an image from it. Feeding the textual prompts as seed data will give rise to similar textual prompts that can in turn be fed to the DALL-E to generate variations to the data.

Example Methods for Performing LLM-Based Utterance Augmentation

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 9:
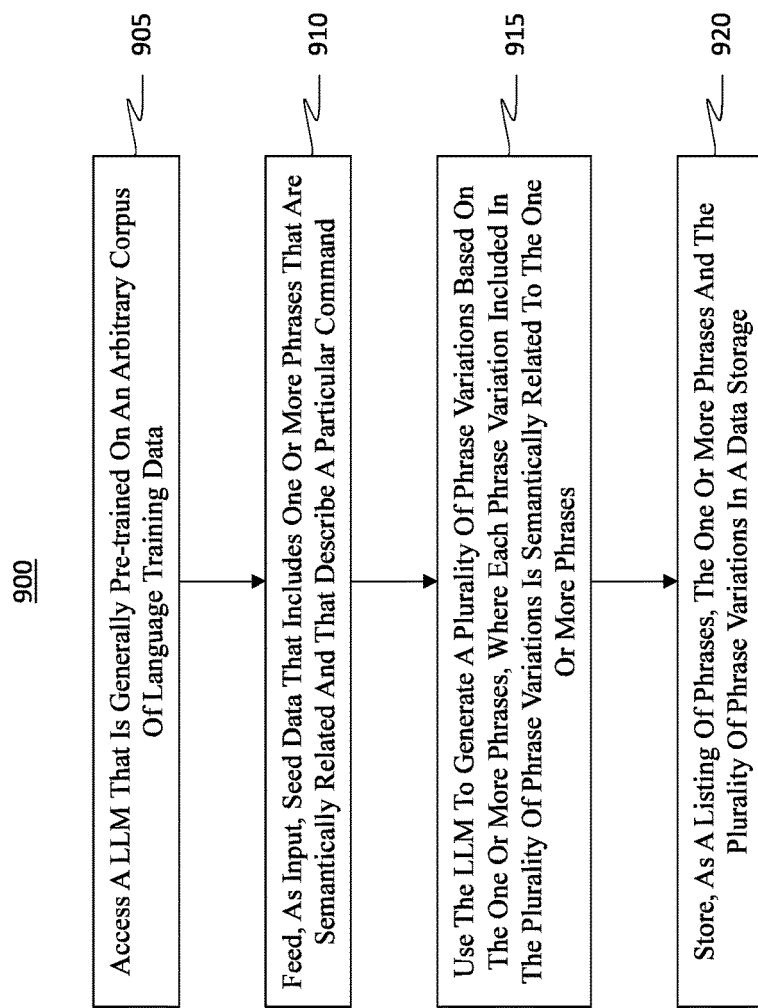
FIG. 9 illustrates a flowchart of an example method for causing an LLM to generate semantically related phrase variations for a phrase that is included in seed data.

Attention will now be directed to FIG. 9, which illustrates a flowchart of an example method 900 for causing a large language model (LLM) to generate semantically related phrase variations for a phrase that is included in seed data, which is provided to the LLM to generate the semantically related phrase variations. Method 900 can be implemented using the architecture 700 of FIG. 7. Furthermore, method 900 can be performed by the service 705, which can include or which can be associated with the LLM 710.

Method 900 includes an act (act 905) of accessing a LLM that is generally pre-trained on an arbitrary corpus of language training data. Act 910 includes feeding, as input, seed data that includes one or more phrases that are semantically related and that describe a particular command. Notably, when the phrases are received as utterance input, the utterance input triggers execution of the particular command. In some cases, a single phrase is fed as input while in other cases, multiple phrases are fed as input.

Act 915 includes causing the LLM to generate a plurality of phrase variations based on the phrases, where each phrase variation is semantically related to the phrases in the seed data. When any one of the phrase variations is received as new utterance input, the new utterance input also triggers the execution of the particular phrase.

Act 920 then includes storing, as a listing of phrases, the phrases in the seed data and the plurality of phrase variations in a data storage. This listing of phrases are identified as being semantically related to one another and are identified as being triggers for executing the particular command. This listing thus operates as an utterance input-output relationship mapping that can optionally be provided to another ML model. In some cases, this listing can also be consulted during a subsequent event in which utterances are being received. The embodiments can determine whether any of the received utterances are included in the listing. If so, then the embodiments can trigger the execution of the related command/intent.

Optionally, the listing of phrases can be provided as new seed data to the LLM. The LLM can then recursively generate additional phrase variations until a stopping criteria is reached (e.g., perhaps a threshold number of phrases are generated or perhaps a time duration expires). The phrase variations represent different ways that the command can be potentially uttered by a user. In some implementations, the listing of phrases includes over 10, 20, 30, 40, 50, 100, or over 1,000 phrase variations.

Accordingly, the embodiments are able to generate training data via a semi-automated mechanism using Large Language Models (LLMs) while putting checks in place to ensure excellent quality of data. To do so, users can upload a seed dataset file containing a list of commands (e.g., perhaps IDE commands) along with a single-line description of the command. The service/application can then iterate over the dataset, reading every command and its description. The service uses the description to generate a set of utterances that most suit the description using a LLM. During the process, the embodiments are able to weed out or filter out any duplicate utterances generated by the LLM. Further, a fuzzy check can optionally be made against the utterances made by the LLM in the past so that during a current iteration, duplicates can be removed. The service can display the generated utterance variations and any fuzzy duplicates. The user then has the option to edit any of the utterances or even delete utterances that do not make sense or that are detected as being too similar to other utterances.

The user can then proceed to use the newly generated utterances as a seed set for more utterances that can be generated by the LLM. The LLM can continue to generate utterances for a particular command infinitely until all possibilities have been exhausted or until a stop criteria has been reached. Once utterances have been generated for a particular command, users may move on to the next command and the process continues until all commands have been covered.

At any point, should a user quit the application, that user's progress can be saved so that the user may resume generating utterances at a later point in time without loss of progress. The user may also download the data in a format of his/her choice with the utterances-command mapping in place.

The disclosed techniques rely on minimal seed data being provided to a LLM in the form of a prompt to generate new utterances. Various checks and balances, such as in the form of duplicate elimination and fuzzy checks, can be implemented to help improve the quality of data being generated. The system also generates utterances exhaustively and has the capability to generate unique utterances that may not merely be a paraphrase of the seed set. Accordingly, numerous benefits can be achieved by practicing the disclosed principles.

Robust Voice Based Language Dictation in an IDE

Using a traditional speech to text (STT) model trained on a particular language (e.g., the English language) will typically fail when used to try to build programming source code using dictation. Typical STT models simply cannot understand the custom coding language (i.e. domain or context) that is inherent to software programming languages. As a result, STT models make substantial errors when they are used to try to generate source code via dictation techniques.

As an example, consider the following scenario. Suppose a user utters the following phrase using a STT model in the domain of an IDE: "COUT hello world". In this example scenario, the term "COUT" is a specific coding term that has an associated programming meaning or code vocabulary meaning to it. The STT model will likely generate the following text based on the verbal utterance: "see out hello world". The command associated with the term "COUT" will not be executed, and use of the transcription will result in a programming error. From this example, one can readily observe how traditional STT models fail to capture the essence or the meaning of phrases that have inherent programmatic meaning and that are spoken in the context or domain of an IDE.

The disclosed embodiments are configured to solve the problems faced by traditional STT models, particularly when used to transcribe specific vocabulary that has an underlying meaning, such as programming code. To do so, the embodiments access a repository of existing programming code that is written in the same programming language. This repository can include any number of different programs.

The embodiments then use a text-to-speech (TTS) model to generate an audio recording of the written program code. Stated differently, the programming code included in the repository is initially in text form. The embodiments feed this text as input into a TTS model. The TTS model consumes this text and generates audio output from the text.

Subsequently, the embodiments access the audio output produced by the TTS model and then feed that audio output to a speech-to-text (STT) model. The STT model then generates a transcription of the audio files. The embodiments then form linkages or relationship pairs between each line of actual code that was included in the repository and the resulting TTS-to-STT generated text. To be clear, each line of code is mapped to a corresponding set of text that was generated based on the TTS and STT model combination. Pairs of code are thus linked together. The first item in the pair is actual, true programming code. The second item in the pair represents a transcription of how the first item in the pair sounds when read out loud. In effect, the embodiments simulate how a user would dictate code without actually having a human involved in the process of dictating that code.

Optionally, the STT model can be configured in various different ways to support different manners of speech. For instance, the STT model can include different pronunciation models or different dialect models to generate text. Different accents can also be used. Also, if a user has various different types of speech impediments or slurring, the embodiments can still operate using that language.

The resulting phrase pairings can then be fed into an LLM in the form of prompts. The LLM can then perform any of the previously disclosed operations described herein using that prompt. Notably, the LLM can form specific connections or linkages between programming language vocabulary included in an utterance and how that vocabulary might be spoken. Thus, when a user utters code that has command-based meanings, those utterances can be properly interpreted in the context of the IDE, and programming vocabulary can accurately be generated when it is recognized in the user's utterances. Accordingly, the embodiments are able to map an utterance to a nearest piece of working code within the context of the IDE. The phrase pairings can be provided to the LLM in a prompt. In some cases, the phrase pairings can be used to fine tune a LLM model (e.g., perhaps a GPT-3 model) to improve its accuracy and performance.

The disclosed embodiments can beneficially be used to perform transcription corrections based on a domain that is currently operational. The principles can be practiced in any domain or context, however, and are not limited to IDEs. For instance, the medical domain has language that is often considered to be highly convoluted, complex, and difficult to pronounce, especially for pharmaceutical products. The disclosed principles can operate in that domain to resolve or correct various transcription errors.

Stated differently, the embodiments can be used to auto-correct a transcript, or rather, can be used to contextualize a transcript based on an identified domain. Stated differently yet again, the embodiments can impose meanings to specific vocabulary based on an identified context in which that vocabulary is being used. In the context or domain of an IDE, the embodiments can perform programming language detection on the repository to determine what specific programming language is stored in the repository. Thus, associations or relationships can be formed for specific types of programming languages.

Example Architecture for Voice Based Language Dictation in an IDE

Figure 10:
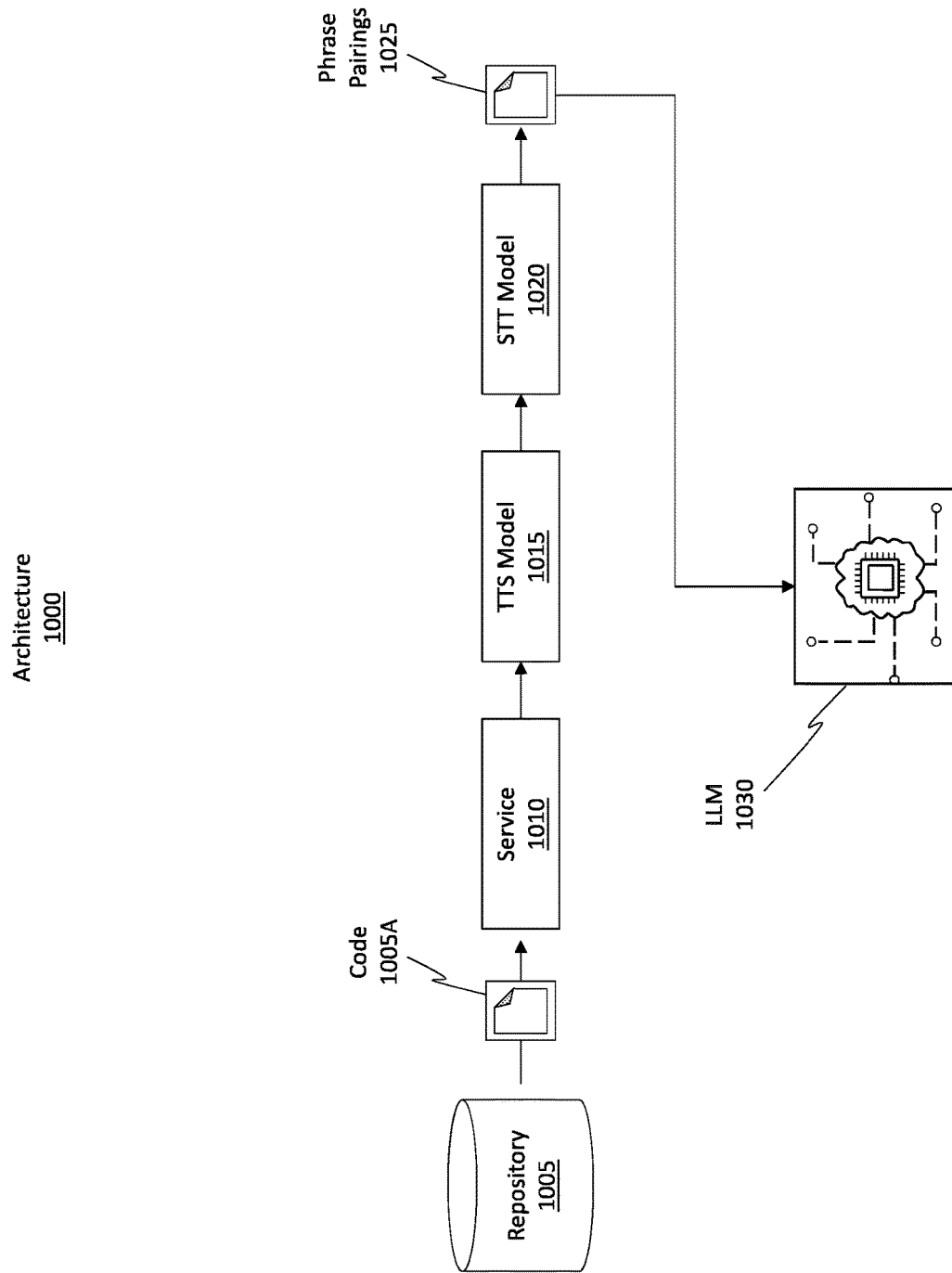
FIG. 10 illustrates an example architecture for facilitating voice based dictation of programming code.

Attention will now be directed to FIG. 10, which illustrates an example architecture 1000 that can be related or perhaps an expansion of the architectures mentioned thus far. Architecture 1000 is shown as including a repository 1005, which includes source code 1005A or programming code for at least one programming language. Optionally, multiple different programs in multiple different programming languages can be stored in the repository 1005. Some embodiments perform language recognition on the code to determine in what language the code is written.

A service 1010 accesses the code 1005A and feeds that code 1005A into a text-to-speech (TTS) model 1015. The TTS model 1015 generates one or more audio files that include audio versions of the text-based code 1005A. The service 1010 then feeds those audio files into a speech-to-text (STT) model 1020.

Figure 11:
FIG. 11 illustrates a listing of phrase pairings.

The STT model 1020 then generates at least one file comprising a transcription of the audio recordings generated by the TTS model 1015. The service 1010 then generates a file comprising the various phrase pairings 1025. In particular, a line of code from the code 1005A is paired with a line of code generated based on the output of the STT model 1020. Thus, the phrase pairings 1025 include an actual line of code as well as a transcription of how that line of code would sound if that line were read out loud. FIG. 11 is representative.

FIG. 11 shows a file comprising the phrase pairings 1100, which is representative of the phrase pairings 1025 from FIG. 10. Notice, this file includes 5 different pairings.

Each pairing includes an "actual" line of code and a "stt_output" transcription for the code. To illustrate, consider the first pairing. The "actual" line of code is as follows: "#Function to check whether the given\n". Previously, that line of code was passed through a TTS model and then a STT model. The resulting output of the STT model is the following phrase: "hashtag function to check whether the given." The service paired this "stt_output" to the "actual" line of code.

Returning to FIG. 10, the service 1010 then passes the phrase pairings 1025 to a LLM 1030. The LLM 1030 is tasked with identifying vocabulary that has specific meaning within the context of an IDE and linking or associating the transcription of that vocabulary to the actual meaning. Thus, if a user were to utter the context-specific vocabulary, corresponding meaning (within the IDE) can be imputed to that vocabulary. An example will be helpful.

With reference to FIG. 11, one of the "actual" phrase pairing values included the following statement: "def isArmstrong(s):\n". The other value included this statement: "Deaf is Armstrong, x." In the context of the IDE, the term "def" has specifically executable or programmatic meaning. When the user utters the term "def", it is desirable to impose the programming language specific executable meaning to that term. The LLM is able to make such associations to ensure that the user's utterances of program-specific vocabulary are attributed their proper meaning, within the context of the IDE.

Example Methods for Performing Voice-Based Language Dictation

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 12:
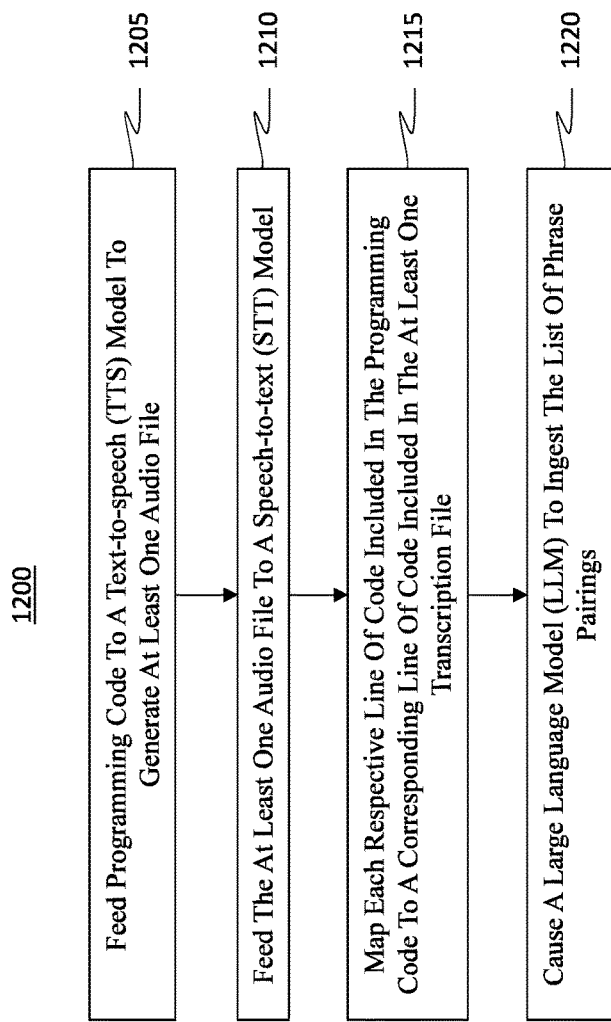
FIG. 12 illustrates a flowchart of an example method for facilitating voice based dictation of programming code within the context of an integrated development environment (IDE).

Attention will now be directed to FIG. 12, which illustrates a flowchart of an example method 1200 for facilitating voice based dictation of programming code within a context of an integrated development environment (IDE) such that vocabulary specific to the programming code is recognizable. Method 1200 can be implemented by the service 1010 shown in FIG. 10.

Act 1205 includes feeding programming code to a text-to-speech (TTS) model. The TTS model generates at least one audio file that is associated with the programming code.

Act 1210 includes feeding the at least one audio file to a speech-to-text (STT) model. The STT model generates at least one transcription file that is associated with the at least one audio file.

Act 1215 includes mapping each respective line of code included in the programming code to a corresponding line of code included in the at least one transcription file, resulting in generation of a listing of phrase pairings. The phrase pairings represent relationships between actual code and how that actual code sounds if read out loud.

Act 1220 includes causing a large language model (LLM) to ingest the list of phrase pairings. The LLM identifies correlations between programming vocabulary that has specific meaning within the context of the IDE and how that programming vocabulary sounds if read out loud.

Method 1200 can optionally include an act of transcribing an utterance comprising programming vocabulary. The programming vocabulary identified within the utterance is converted from STT language to language that has specific meaning within the context of the IDE. This conversation can be based on the correlations identified by the LLM. Accordingly, the disclosed embodiments are beneficially able to attribute specific contextual meaning to terms that are identified within an utterance, where those terms are recognized by the embodiments as having particular meaning.

Example Computer/Computer Systems

Figure 13:
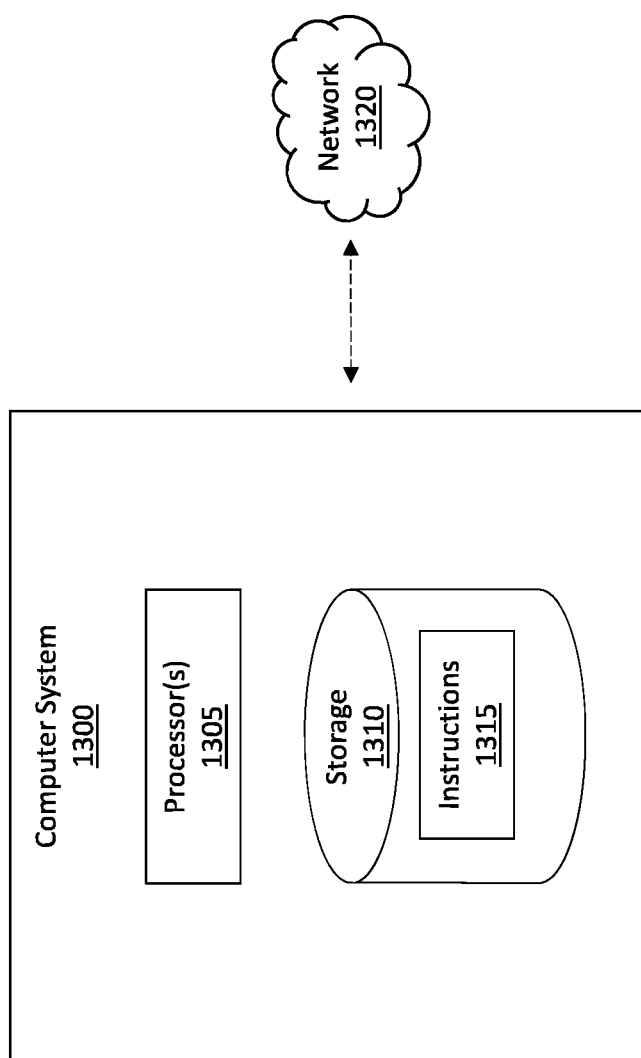
FIG. 13 illustrates an example computer system that can be configured to perform any of the disclosed operations.

Attention will now be directed to FIG. 13 which illustrates an example computer system 1300 that may include and/or be used to perform any of the operations described herein. Computer system 1300 may take various different forms. For example, computer system 1300 may be embodied as a tablet, a desktop, a laptop, a mobile device, or a standalone device, such as those described throughout this disclosure. Computer system 1300 may also be a distributed system that includes one or more connected computing components/devices that are in communication with computer system 1300.

In its most basic configuration, computer system 1300 includes various different components. FIG. 13 shows that computer system 1300 includes one or more processor(s) 1305 (aka a "hardware processing unit") and storage 1310.

Regarding the processor(s) 1305, it will be appreciated that the functionality described herein can be performed, at least in part, by one or more hardware logic components (e.g., the processor(s) 1305). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 1300. The different components, modules, engines, and services described herein may be implemented as objects or processors that execute on computer system 1300 (e.g. as separate threads).

Storage 1310 may be physical system memory, which may be volatile, non-volatile, or some combination of the two. The term "memory" may also be used herein to refer to non-volatile mass storage such as physical storage media. If computer system 1300 is distributed, the processing, memory, and/or storage capability may be distributed as well.

Storage 1310 is shown as including executable instructions 1315. The executable instructions 1315 represent instructions that are executable by the processor(s) 1305 of computer system 1300 to perform the disclosed operations, such as those described in the various methods.

The disclosed embodiments may comprise or utilize a special-purpose or general-purpose computer including computer hardware, such as, for example, one or more processors (such as processor(s) 1305) and system memory (such as storage 1310), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1300 may also be connected (via a wired or wireless connection) to external sensors (e.g., one or more remote cameras) or devices via a network 1320. For example, computer system 1300 can communicate with any number devices or cloud services to obtain or process data. In some cases, network 1320 may itself be a cloud network. Furthermore, computer system 1300 may also be connected through one or more wired or wireless networks to remote/separate computer systems(s) that are configured to perform any of the processing described with regard to computer system 1300.

A "network," like network 1320, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1300 will include one or more communication channels that are used to communicate with the network 1320. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for causing a large language model (LLM) to generate semantically related phrase variations for a phrase that is included in seed data, which is provided to the LLM to generate the semantically related phrase variations, said method comprising:
   accessing an LLM that is pre-trained on an arbitrary corpus of language training data;
   feeding, as input, seed data that includes a plurality of phrases that are semantically related and that describe a particular command, wherein, when any one phrase in the plurality of phrases is received as utterance input, the utterance input triggers execution of the particular command;
   causing the LLM to generate a plurality of phrase variations based on the plurality of phrases, where each phrase variation included in the plurality of phrase variations is semantically related to the plurality of phrases, and wherein, when any one of the phrase variations in the plurality of phrase variations is received as new utterance input, the new utterance input also triggers the execution of the particular phrase;
   storing, as a listing of phrases, the plurality of phrases and the plurality of phrase variations in a data storage, wherein the plurality of phrases and the plurality of phrase variations in the listing of phrases are identified as being semantically related to one another and are identified as being triggers for executing the particular command;
   accessing an utterance that includes an intent and a slot, wherein the intent and the slot are associated with a context of an application for which the intent and the slot are directed;
   using a speech-to-text (STT) engine to generate a transcription of the utterance, wherein the STT engine generates an erroneous transcription of the slot, said erroneous transcription being erroneous with respect to the context of the application, such that an erroneous slot is generated;
   generating a prompt for the LLM, the prompt structured to instruct the LLM to identify the slot within the transcription, wherein:
      the prompt is further structured to include the context of the application,
      the context within the prompt operates to guide the LLM when the LLM is identifying the slot in the transcription,
      the prompt, via the context, instructs the LLM to give a weighted preference to the context as opposed to a generalized knowledge bank of the LLM, and
      the weighted preference causes the LLM to map the erroneous slot to a correct slot.

2. The method of claim 1, wherein the listing of phrases is provided as new seed data to the LLM.

3. The method of claim 2, wherein the LLM recursively generates additional phrase variations until a stopping criteria is reached.

4. The method of claim 1, wherein the seed data represents a baseline descriptor for the particular command.

5. The method of claim 1, wherein the plurality of phrase variations represent different ways that the particular command can be potentially uttered by a user.

6. The method of claim 1, wherein causing the LLM to generate the plurality of phrase variations includes causing the LLM to generate a select number of phrase variations.

7. The method of claim 1, wherein causing the LLM to generate the plurality of phrase variations includes causing the LLM to continuously generate phrase variations until a designated time period expires.

8. The method of claim 1, wherein the plurality of phrase variations are submitted for user review.

9. The method of claim 1, wherein the listing of phrases is stored in a prompt that operates as a scalable record of seed data and variations.

10. The method of claim 1, wherein the method further includes, subsequent to storing the listing of phrases, refraining from further use of the LLM when a subsequent utterance is received.

11. The method of claim 1, wherein the listing of phrases includes over 10 phrases or phrase variations.

12. The method of claim 11, wherein a filtering operation is performed on the listing of phrases to remove duplicate phrases.

13. The method of claim 1, wherein a number of phrases included in the plurality of phrases is less than a preselected threshold number.

14. The method of claim 1, wherein the listing of phrases represent a hash map for the particular command, where the hash map reflects different utterance inputs that are available to trigger execution of the particular command.

15. The method of claim 1, wherein the method further includes using the listing of phrases to train a machine learning model that is tasked with generating additional phrase variations.

16. A computer system that causes a large language model (LLM) to generate semantically related phrase variations for a phrase that is included in seed data, which is provided to the LLM to generate the semantically related phrase variations, said computer system comprising:
   at least one processor; and
   at least one hardware storage device that stores instructions that are executable by the at least one processor to cause the computer system to:
      access an LLM that is pre-trained on an arbitrary corpus of language training data;
      feed, as input, seed data that includes a plurality of phrases that are semantically related and that describe a particular command, wherein, when any one phrase in the plurality of phrases is received as utterance input, the utterance input triggers execution of the particular command;
      cause the LLM to generate a plurality of phrase variations based on the plurality of phrases, where each phrase variation included in the plurality of phrase variations is semantically related to the plurality of phrases, and wherein, when any one of the phrase variations in the plurality of phrase variations is received as new utterance input, the new utterance input also triggers the execution of the particular phrase;
      store, as a listing of phrases, the plurality of phrases and the plurality of phrase variations in a data storage, wherein the plurality of phrases and the plurality of phrase variations in the listing of phrases are identified as being semantically related to one another and are identified as being triggers for executing the particular command;

access an utterance that includes an intent and a slot, wherein the intent and the slot are associated with a context of an application for which the intent and the slot are directed;

use a speech-to-text (STT) engine to generate a transcription of the utterance, wherein the STT engine generates an erroneous transcription of the slot, said erroneous transcription being erroneous with respect to the context of the application, such that an erroneous slot is generated;

generate a prompt for the LLM, the prompt structured to instruct the LLM to identify the slot within the transcription, wherein:
- the prompt is further structured to include the context of the application,
- the context within the prompt operates to guide the LLM when the LLM is identifying the slot in the transcription,
- the prompt, via the context, instructs the LLM to give a weighted preference to the context as opposed to a generalized knowledge bank of the LLM, and
- the weighted preference causes the LLM to map the erroneous slot to a correct slot.

17. The computer system of claim 16, wherein the listing of phrases operates as a set of input-output relationships for a machine learning model to operate on to generate additional phrase variations.

18. The computer system of claim 16, wherein a fuzzy check is performed on the listing of phrases to remove duplicate phrases.

19. The computer system of claim 16, wherein a filtering operation is performed on the listing of phrases to remove duplicate phrases.

20. A computer system that causes a large language model (LLM) to generate semantically related phrase variations for a phrase that is included in seed data, which is provided to the LLM to generate the semantically related phrase variations, said computer system comprising:

at least one processor; and at least one hardware storage device that stores instructions that are executable by the at least one processor to cause the computer system to:

access an LLM that is pre-trained on a corpus of language training data;

feed, as input, seed data that includes a phrase that describes a command, wherein, when the phrase is received as utterance input, the utterance input triggers execution of the command;

cause the LLM to generate a plurality of phrase variations based on the phrase, where each phrase variation included in the plurality of phrase variations is semantically related to the phrase, and wherein, when any one of the phrase variations in the plurality of phrase variations is received as new utterance input, the new utterance input also triggers the execution of the phrase;

store, as a listing of phrases, the phrase and the plurality of phrase variations in a data storage, wherein the phrase and the plurality of phrase variations in the listing of phrases are identified as being semantically related to one another and are identified as being triggers for executing the command;

access an utterance that includes an intent and a slot, wherein the intent and the slot are associated with a context of an application for which the intent and the slot are directed;

use a speech-to-text (STT) engine to generate a transcription of the utterance, wherein the STT engine generates an erroneous transcription of the slot, said erroneous transcription being erroneous with respect to the context of the application, such that an erroneous slot is generated;

generate a prompt for the LLM, the prompt structured to instruct the LLM to identify the slot within the transcription, wherein:
- the prompt is further structured to include the context of the application,
- the context within the prompt operates to guide the LLM when the LLM is identifying the slot in the transcription,
- the prompt, via the context, instructs the LLM to give a weighted preference to the context as opposed to a generalized knowledge bank of the LLM, and
- the weighted preference causes the LLM to map the erroneous slot to a correct slot.

* * * * *